(12) United States Patent
Livingston (10) Patent No.: US 10,413,135 B2
(45) Date of Patent: Sep. 17, 2019

(54) METHOD OF SECURING TOWEL TO A RACK

(71) Applicant: Melissa Livingston, McKinney, TX (US)

(72) Inventor: Melissa Livingston, McKinney, TX (US)

( * ) Notice: Subject to any disclaimer, the term of this patent is extended or adjusted under 35 U.S.C. 154(b) by 0 days.

(21) Appl. No.: 15/186,356

(22) Filed: Jun. 17, 2016

(65) Prior Publication Data
US 2016/0324374 A1    Nov. 10, 2016

Related U.S. Application Data

(62) Division of application No. 13/733,447, filed on Jan. 3, 2013, now abandoned.

(60) Provisional application No. 61/671,639, filed on Jul. 13, 2012.

(51) Int. Cl.
| | |
|---|---|
| *A47K 10/02* | (2006.01) |
| *B32B 7/14* | (2006.01) |
| *A47L 19/00* | (2006.01) |
| *B32B 3/10* | (2006.01) |
| *B32B 7/08* | (2019.01) |
| *B32B 7/05* | (2019.01) |
| *A47L 13/16* | (2006.01) |
| *A47L 13/51* | (2006.01) |
| *B32B 5/06* | (2006.01) |
| *B32B 5/26* | (2006.01) |

(52) U.S. Cl.
CPC ............ *A47K 10/02* (2013.01); *A47K 10/025* (2013.01); *A47L 13/16* (2013.01); *A47L 13/51* (2013.01); *A47L 19/00* (2013.01); *B32B 3/10* (2013.01); *B32B 5/06* (2013.01); *B32B 5/26* (2013.01); *B32B 7/05* (2019.01); *B32B 7/08* (2013.01); *B32B 7/14* (2013.01); *B32B 2250/20* (2013.01); *B32B 2250/44* (2013.01); *B32B 2262/062* (2013.01); *B32B 2555/00* (2013.01); *Y10T 29/49826* (2015.01); *Y10T 428/23986* (2015.04); *Y10T 428/24314* (2015.01); *Y10T 428/24802* (2015.01); *Y10T 428/24851* (2015.01)

(58) Field of Classification Search
CPC ...... A47K 10/02; A47K 10/04; A47K 10/025; Y10T 428/24314
See application file for complete search history.

(56) References Cited

U.S. PATENT DOCUMENTS

| | | | | |
|---|---|---|---|---|
| 4,771,502 | A * | 9/1988 | Trimble ............... | A45F 5/00 15/209.1 |
| 5,016,288 | A * | 5/1991 | Pan ..................... | A41D 23/00 2/207 |
| 6,351,869 | B1 * | 3/2002 | Jones .................. | A47L 13/16 15/209.1 |

(Continued)

FOREIGN PATENT DOCUMENTS

DE    202011104376 U1 * 10/2011  ............. A47K 10/02

*Primary Examiner* — Jermie E Cozart (57) ABSTRACT

The invention is a towel having a fabric base having a quadrilateral shape and a coupled first horizontal strip having a quadrilateral shape, the first horizontal strip being coupled proximate the top edge of the fabric base in a manner so as to create a loop formed by the fabric base and first horizontal strip. The invention is also a method of securing the towel to a rod, rack, bar or handle.

4 Claims, 7 Drawing Sheets

(56) References Cited

U.S. PATENT DOCUMENTS

| | | | | |
|---|---|---|---|---|
| 6,368,695 B1* | 4/2002 | Gabriele | A47K 10/02 428/100 |
| 6,562,437 B2* | 5/2003 | Bunkley | A47K 10/20 428/100 |
| 9,045,266 B1* | 6/2015 | Mitchell | A47K 10/025 |
| 2004/0123386 A1* | 7/2004 | Higashi | A45C 3/10 5/420 |
| 2007/0022518 A1* | 2/2007 | Sheu | A41D 23/00 2/207 |
| 2007/0050951 A1* | 3/2007 | Simmons | A47K 10/025 24/7 |
| 2007/0204383 A1* | 9/2007 | Hunt | A47K 10/02 2/174 |
| 2012/0137431 A1* | 6/2012 | Pittman | A47G 9/062 5/417 |
| 2012/0242126 A1* | 9/2012 | Burns | A47C 31/11 297/228.12 |
| 2013/0071597 A1* | 3/2013 | Tvelil | A47K 10/02 428/54 |
| 2013/0236733 A1* | 9/2013 | Craig | A47K 10/025 428/542.6 |

* cited by examiner

METHOD OF SECURING TOWEL TO A RACK

CROSS REFERENCE TO RELATED APPLICATION

This application claims priority to U.S. Provisional Application No. 61/671,639 filed on Jul. 13, 2012, entitled "TOWEL HAVING SECURING APERTURE AND METHOD OF SECURING TOWEL TO A RACK" and is a divisional of U.S. Regular patent application Ser. No. 13/733,447, TOWEL HAVING SECURING APERTURE AND METHOD OF SECURING TOWEL TO A RACK, filed Jan. 3, 2013.

TECHNICAL FIELD

The present invention relates to towels, such as dish and hand towels as would be used in a kitchen, bathroom, washroom, laundry room or as, e.g., a sports or golf towel.

BACKGROUND OF THE INVENTION

It is a well known practice to hang towels, such as, but not limited to, dish towels and hand towels on towel rings or towel racks, including ad-hoc racks formed by handles of drawer pulls and handles on kitchen appliances such as ovens or refrigerators. It takes some amount of skill to position the towel on such actual and ad-hoc racks so that the weight of each side of the towel bisected by the rack is substantially equal to the other, such equilibrium being required to keep the towel from sliding off the rack. Disadvantageously, if the towel is out of equilibrium, meaning one end of the towel is even slightly heavier that the other, then it does not take much applied force to cause the towel to slide off the rack and onto, e.g., the floor. Even if the towel is in equilibrium, if a household has small children, it is often the case that such towels end up on the floor if the towel is within reach of the child. What is desired is a towel having a structure that allows it to be secured to a rack without the use of clips, cups, snaps, hook and loop fasteners such as VELCRO® brand fasteners, ties and the like.

SUMMARY OF THE INVENTION

As used herein, the relationship of the parts of the invention are with reference to generally quadrilateral fabric shapes, such as a rectangle. Each such rectangle has a front and back, a perimeter comprising a top edge, right edge, bottom edge, and left edge. In a first orientation, the top edge and bottom edge have substantially equal lengths but are shorter than the right edge and left edge, which right edge and left edge also have substantially equal lengths. In a second orientation, the top edge and bottom edge have lengths that are longer than the right edge and left edge. As the parts of the invention are made of fabric, the thickness of the invention is de minimis when compared to the length and width of the fabric, although one skilled in the art would recognize that some material, such as terry cloth, is thicker than cloth linen, both of which fabrics can be used in making the invention. The use of the foregoing designations are merely to show the relative positions of the different portions of the invention with respect to the others and are not to be construed as limiting the invention.

The invention comprises a substantially planar fabric base in a quadrilateral shape, preferably a rectangle in a first orientation, further having coupled thereto a substantially planar first horizontal strip in a second orientation having a rectangular shape. The first horizontal strip is coupled toward the top edge of the fabric base using, e.g., stitching, using two rectangular patterns dictated by, respectively, the left one-third of the fabric base and the right one-third of the fabric base, thus leaving an opening between the planar back surface of the horizontal strip and the front planar surface of the fabric base, such opening forming an aperture or loop between the fabric base and horizontal strip in the respective middle one-third thereof. The creation of this loop facilitates a method of the invention. When the left one-third of the invention is folded back and then the right one-third of the invention is folded back (or vice versa), the loop formed between the respective middle one-third of the fabric base and first horizontal strip remains toward the user. The invention is then placed in front of a rack and the bottom edge of the invention is pulled up under the rack, then looped over the rack from behind and then fed through the loop, the loop being, as mentioned, the opening between the fabric base and the horizontal strip. In this manner, the invention is secured to the rack and cannot be pulled off of it from below. In a second embodiment of the invention, instead of a horizontal strip, the fabric base has a horizontal slit proximate the top of the fabric base in the middle one-third of the fabric base.

The fabric base can be comprised of any suitable fabric, such as cotton, linen, blended fabrics, calico, terry cloth, and the like. The invention can be made decorative by using a print such as a floral pattern or the like, on the horizontal strip, on the fabric base, or on a second, lower horizontal strip coupled to the fabric base. Such lower horizontal strip can have a decorative pattern and/or color matched to the upper horizontal strip.

BRIEF DESCRIPTION OF THE DRAWINGS

For a better understanding of the present invention including the features, advantages and specific embodiments, reference is made to the following detailed description along with accompanying drawings in which.

DETAILED DESCRIPTION OF A PREFERRED EMBODIMENT

While the making and using of the preferred embodiments of the present invention is discussed in detail below, it should be appreciated that the present invention provides many applicable inventive concepts which can be embodied in a wide variety of specific contexts. Some features of the preferred embodiment shown and discussed may be simplified or exaggerated for illustrating the principles of the invention.

Figure 1:
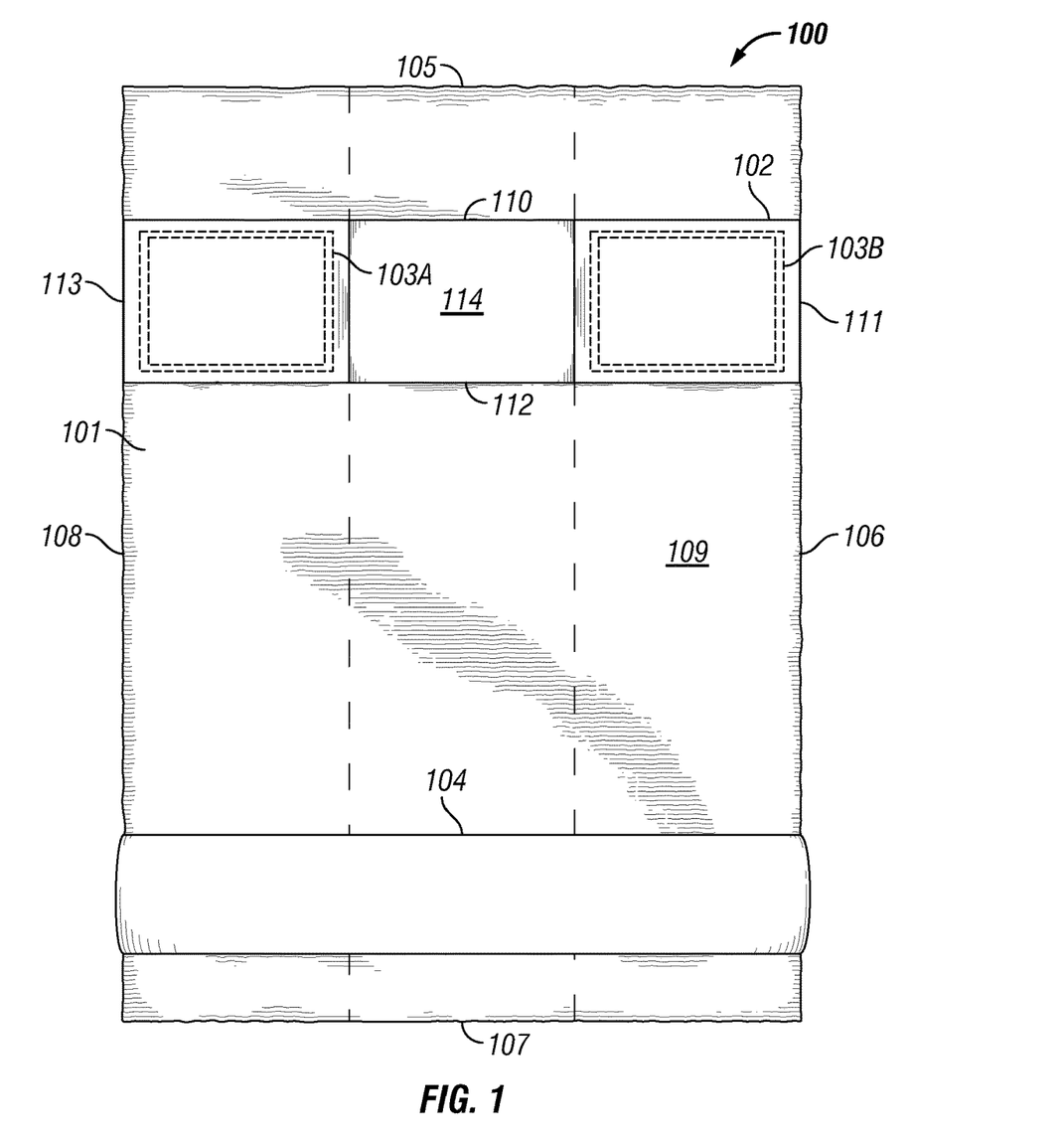
FIG. 1 is a view of the first embodiment of the invention in the unfolded position, showing the stitching patterns of the first horizontal strip to the fabric base.

As noted, the relationship of the parts of the invention are with reference to generally quadrilateral fabric shapes, such as a rectangle. As seen in FIG. 1, the invention 100 comprises a fabric base 101 rectangle shape that is substantially planar and has a front 109 and back (not shown), and a perimeter comprising a top edge 105, right edge 106, bottom edge 107, and left edge 108. The invention 100 further comprises a first horizontal strip 102 having a rectangle shape that is substantially planar and has a front 114 and back (not shown), and a perimeter comprising a top edge 110, right edge 111, bottom edge 112, and left edge 113. The first horizontal strip 102 is coupled or affixed to the fabric base 101. With respect to fabric base 101, the top edge 105 and bottom edge 107 are substantially equal in length and have a length that is shorter than the right edge 106 and left edge 107, the right edge 106 and left edge 107 being substantially equal in length. With respect to horizontal strip 102, the top edge 110 and bottom edge 112 are substantially equal in length and have a length that is longer than the right edge 111 and left edge 113, the right edge 111 and left edge 113 being substantially equal in length.

As the parts of the invention are made of fabric, the thickness of the invention is de minimis when compared to the length and width of the fabric, although one skilled in the art would recognize that some material, such as terry cloth, is thicker than cloth linen, both of which fabrics can be used in making the invention. The use of the foregoing designations are merely to show the relative positions of the different portions of the invention with respect to the other and are not to be construed as limiting the invention.

Referring again to FIG. 1, the invention 100 comprises a fabric base 101 in a quadrilateral shape, preferably a rectangle further having coupled thereto first horizontal strip 102 having a rectangular shape. The fabric base 101 has an orientation to the first horizontal strip 102 as follows: The fabric bases' top edge 105 and bottom edge 107 are in a horizontal position and its right edge 106 and left edge 108 are in a vertical position when the first horizontal strips' top edge 110 and bottom edge 112 are in horizontal position and the right edge 111 and left edge 113 are in a vertical position. The first horizontal strip 102 is positioned toward, or at, the top edge 105 of the fabric base 101 using, e.g., stitching pattern 103A, along a left one-third of the fabric base 101, and a further stitching pattern 103B along the right one-third of the fabric base 101, each stitching pattern further performed, inter alia, in a rectangular pattern, thus leaving an opening between the planar back of first horizontal strip 102 and the planar front 109 of the fabric base 101. Any suitable stitching pattern, or method of affixing first horizontal strip 102 to fabric base 101 can be used so long as the pattern or method of affixing results in the creation of loop 202 as described with respect to FIG. 2. As the size of the fabric base 101 of the towel is increased, for example if the invention is intended for use as a bath towel or beach towel, the horizontal strip 102 would be positioned lower across the fabric base 101, either approximately equidistant between the top edge 105 of fabric base 101 and a line bisecting the center of the fabric base 101 or closer to said center bisecting line.

Figure 2:
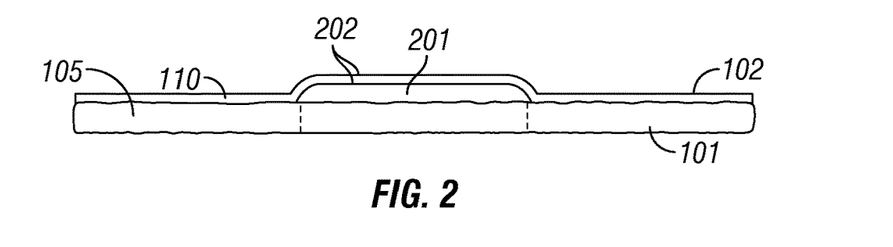
FIG. 2 is end view from the top edge of the first embodiment of the invention in the unfolded position, showing the loop formed between the fabric base and the first horizontal strip.

Referring to FIG. 2, looking down at the top edge 105, 110 of the fabric base 101 and first horizontal strip 102, respectively, of invention 100, an opening 201 between fabric base 101 and first horizontal strip 102 forms a loop 202 between the fabric base 101 and horizontal strip 102 in the middle third thereof. In addition to being part of invention 100, the loop 202 facilitates a method of the invention.

Figure 3:
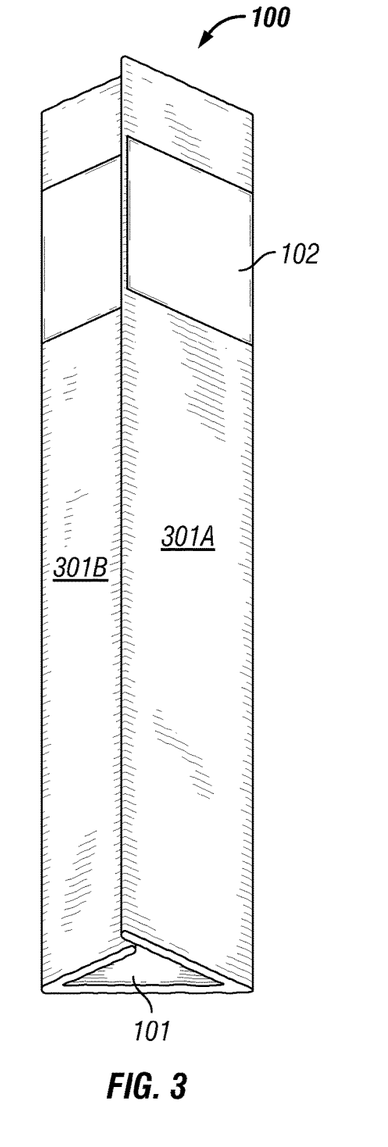
FIG. 3 is a perspective view of the first embodiment of the invention being folded in thirds.

FIGS. 3-6 illustrate one method of securing invention 100 to a rack. Referring to FIG. 3, the invention 100 has been turned around to show the left one-third 301A of the invention 100 being folded back and the right one-third 301B being folded lengthwise to the fabric base 101 and orthogonally to the width of first horizontal strip 102, In this view, the loop 202 faces away from the user.

Figure 4:
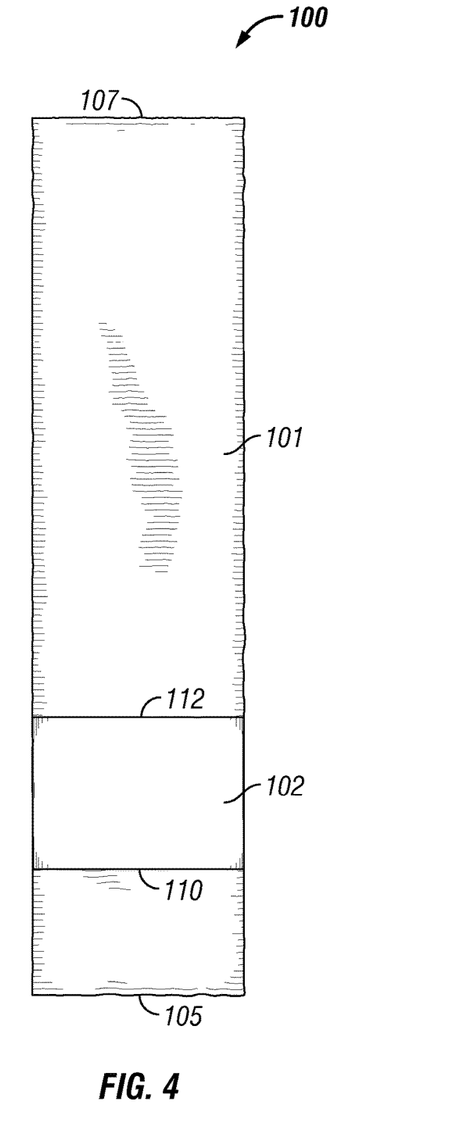
FIGS. 4, 5, 6 and 7 are views of the first embodiment of the invention being positioned onto a rack.
Figure 5:
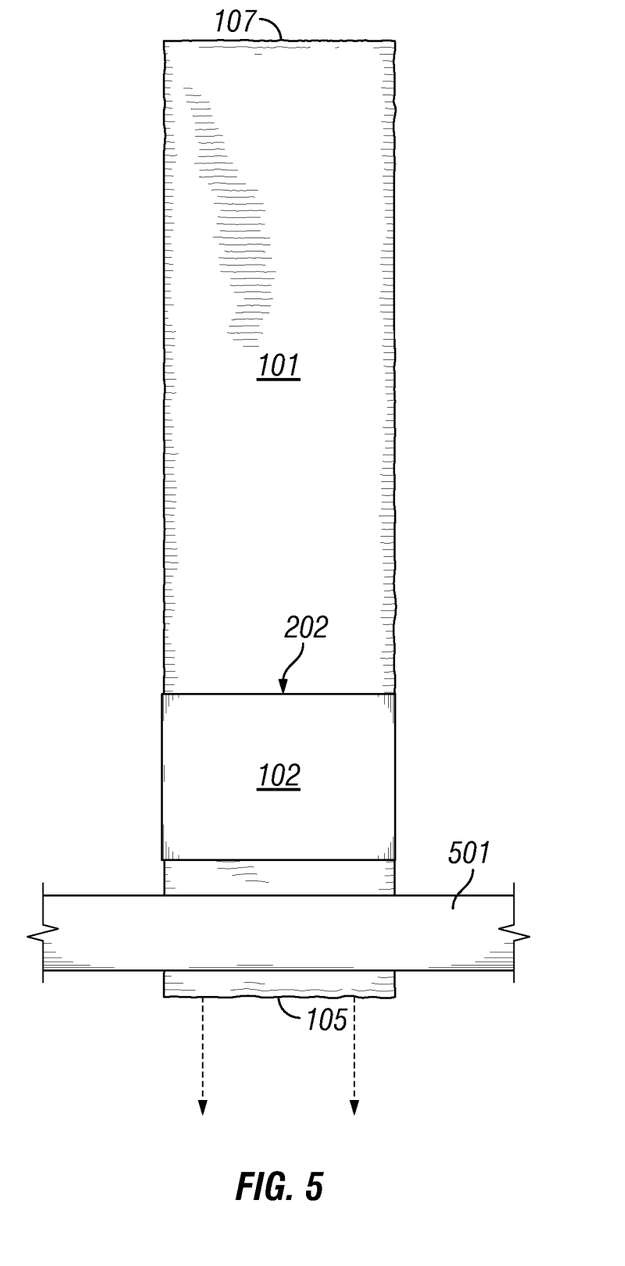
Figure 6:
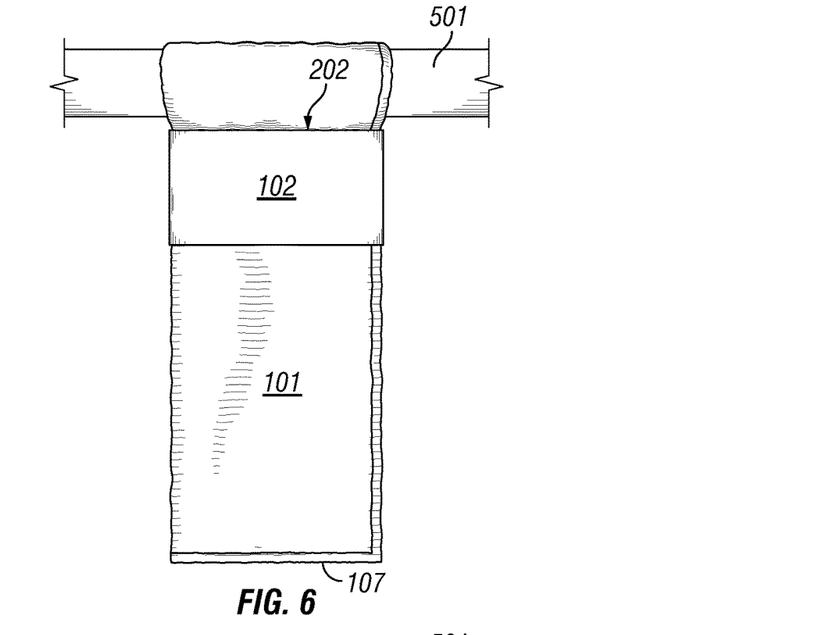
Figure 7:
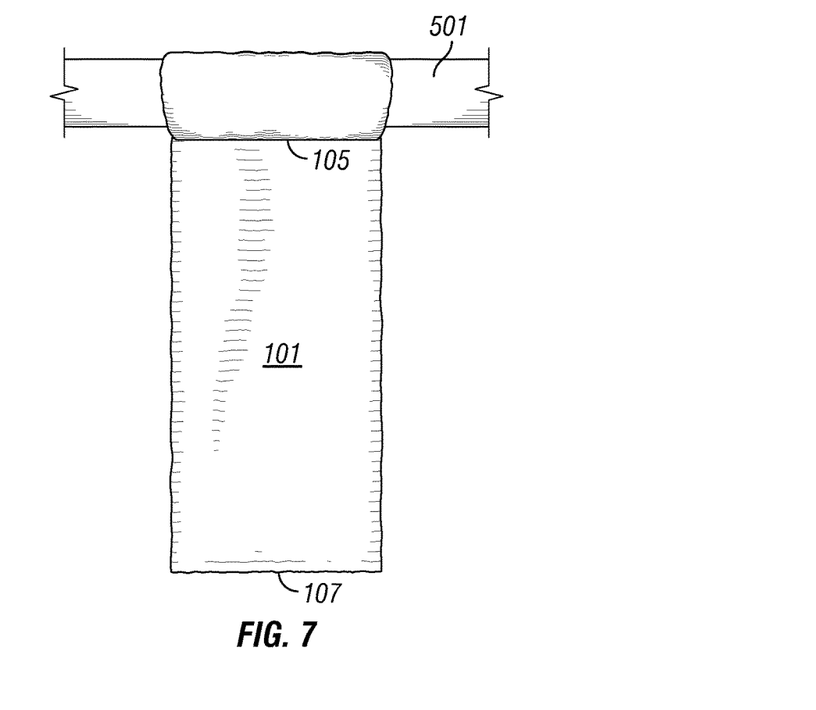

Referring to FIG. 4, the invention 100 is then held by the bottom edge 107 of the fabric base 101 and, as seen in FIG. 5, positioned behind a bar 501 or other horizontal member of a rack. As seen in FIG. 6, the bottom edge 107 of fabric base 101 is looped over the rack 501 and then through the loop 202, being the opening between the fabric base 101 and the first horizontal strip 102. In a final step, the fabric base is straightened into position in a neat and orderly fashion on the rack. In this manner, the invention 100 is secured to the rack 501 and cannot be pulled off from below as seen in FIG. 6. In fact, pulling bottom edge 107 of fabric base 101 further secures invention 100 to rack 501. FIG. 7 shows a rear view of the invention after being secured to a rack.

Figure 8:
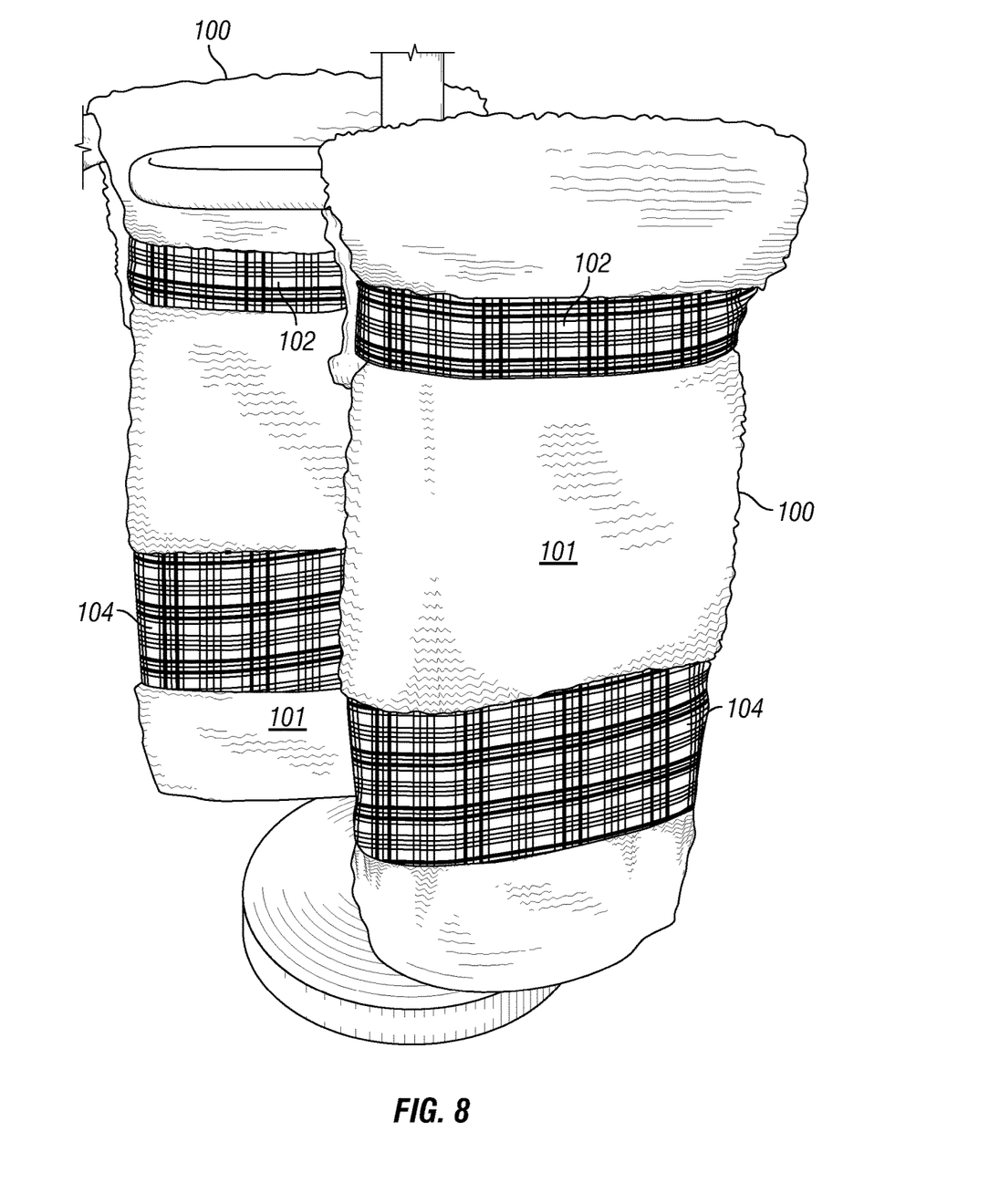
FIG. 8 is a view of a pair of the first embodiments of the invention positioned onto a bathroom type rack.

FIG. 8 is a perspective view of a pair of the invention 100 having terry cloth fabric bases 101 both secured to a bathroom type rack.

The fabric base 101 and horizontal strip 102 can be comprised of any suitable fabric, such as cotton, linen, blended fabrics, calico, terry cloth, and the like. The invention can be made decorative by using a print such as a floral pattern or the like, on the horizontal strip 102, on the fabric base, or on a second, lower horizontal strip 104 coupled to the fabric base as seen in FIG. 1. Such lower horizontal strip 104 can be pattern and/or color matched to the first horizontal strip 102.

Figure 9:
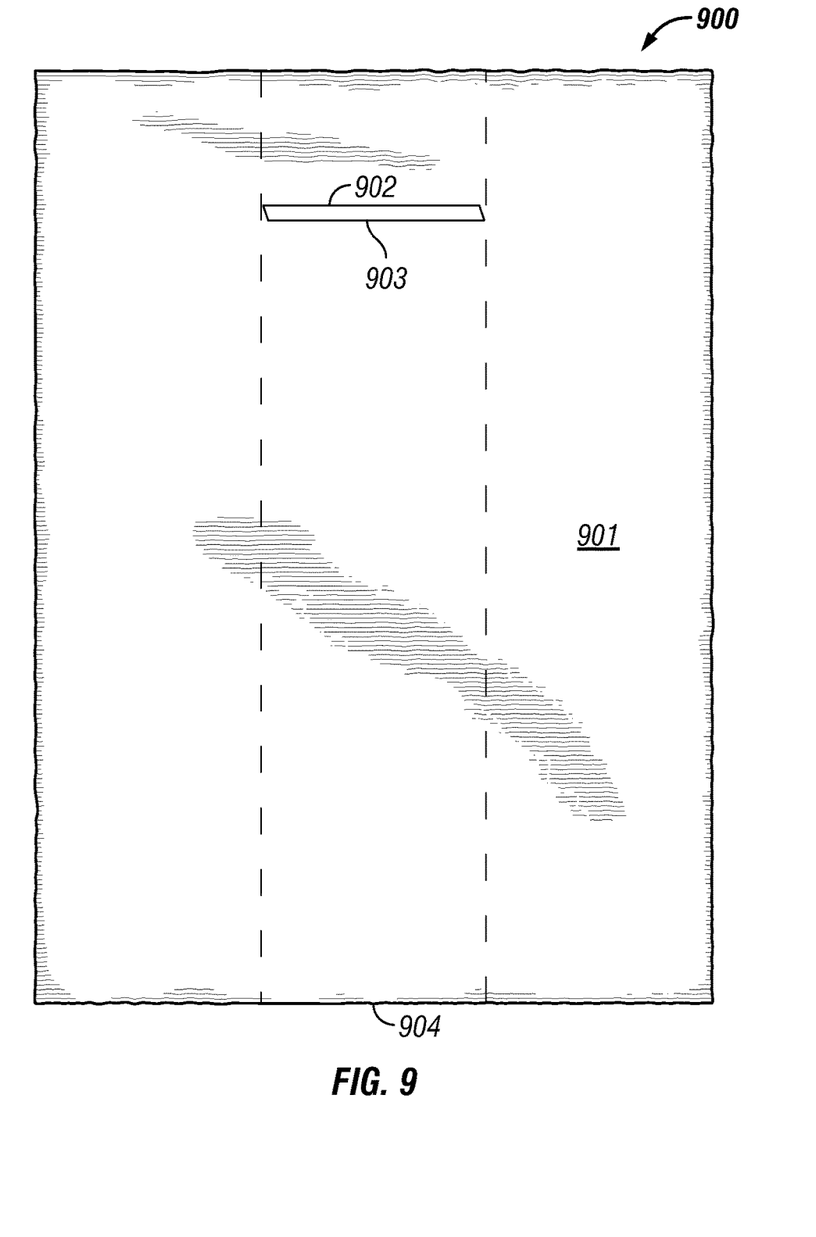
FIG. 9 is a plan view of the second embodiment of the present invention in the unfolded position.

FIG. 9 provides a plan view of the second embodiment of the invention 900. As seen therein, fabric base 901 further has a quadrilateral shape in a first orientation, with a horizontal slit 902 proximate the top side of the fabric base so as to create an aperture 903 for receiving a portion thereof there-through. Similar to the first embodiment, in use, the fabric base 901 is folded in thirds lengthwise to the fabric base 901 and orthogonally to the horizontal slit 902. The horizontal slit 902 facilitates a method of the invention. The left one-third of the invention 900 is folded over and the right one-third is folded over (orthogonally to the slit 902), so that the slit faces away from the user. The second embodiment of the invention 900 is then placed behind a horizontal member, bar or rack and the bottom edge 904 of the fabric base 901 is looped over the rack and then through the aperture 903 formed by horizontal slit 902. In this manner, the invention 900 is secured to the rack and cannot be pulled off of it from below.

Figure 10:
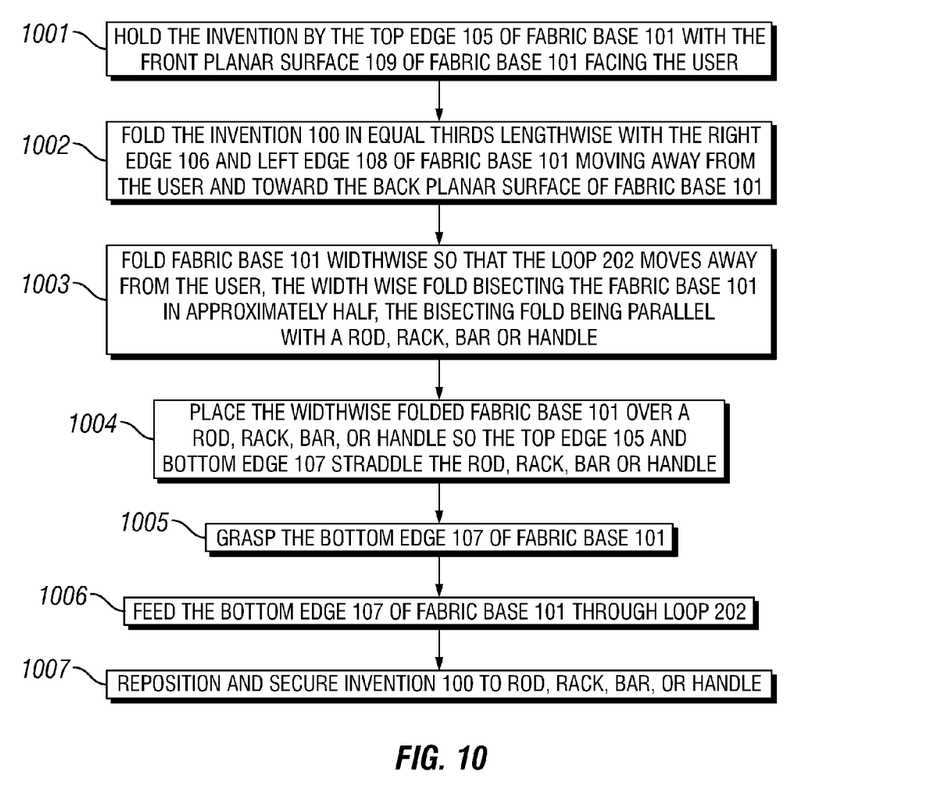
FIG. 10 is a flow chart of one method of the invention.

An additional method of securing the invention 100 to a rack 501 comprises the following steps as shown in FIG. 10: (1001) hold the invention by the top edge 105 of fabric base 101 with the front planar surface 109 of fabric base 101 facing the user; (1002) fold the invention 100 in equal thirds lengthwise with the right edge 106 and left edge 108 of fabric base 101 moving away from the user and toward the back planar surface of fabric base 101; (1003) fold fabric base 101 width wise so that the loop 202 moves away from the user, the widthwise fold bisecting the fabric base 101 in approximately half, the bisecting fold being parallel with a rod, rack, bar or handle; (1004) place the width-wise folded fabric base 101 over a rod, rack, bar or handle so the top edge 105 and bottom edge 107 straddle the rod, rack, bar or handle; (1005) grasp the bottom edge 107 of fabric base 101;

(1006) feed the bottom edge 107 of fabric base 101 through loop 202; and (1007) reposition and secure invention 100 to rod, rack, bar or handle.

The embodiments shown and described herein are only exemplary. Even though characteristics and advantages of the present invention have been set forth in the foregoing description together with details of the invention, the disclosure is illustrative only and changes may be made within the principles of the invention to the full extent indicated by the broad general meaning of the terms used in the attached claims. For example, either or both of the shapes of the fabric base and horizontal strip can be squares so long as the coupling of the horizontal strip to the fabric base creates a loop through which the towel can be fed through to secure it to a rack.

I claim:

1. A method of securing a towel to a horizontal member, wherein the towel is comprised of a fabric base and a fabric strip with a fabric strip right edge and a fabric strip left edge, the fabric strip right edge and the fabric strip left edge each being affixed to a front planar surface of the fabric base, the fabric strip and the portion of the fabric base proximate thereto thus comprising a loop, the loop positioned a distance beginning approximately ⅓ from a right vertical edge of the fabric base and ending approximately ⅓ the distance from a left edge of the fabric base, the loop being proximate a top edge of the fabric base, comprising the steps of:

holding the towel by the top edge of the fabric base with the front planar surface of the fabric base facing a user;

folding the towel in equal thirds lengthwise wherein the right vertical edge of the fabric base and the left vertical edge of the fabric base each move away from the user and toward the back planar surface of fabric base;

rotating the folded towel so that the folded towel is held from a bottom edge of the fabric base and the loop is facing away from the user, positioning the towel behind the horizontal member so that the lengthwise midsection of the towel is bisected by the horizontal member;

folding the towel over the horizontal member, a back folded half of the towel and a front folded half of the towel straddling the horizontal member, the loop facing away from the user;

grasping the bottom edge of the fabric base comprising the front folded half of the fabric base;

feeding the bottom edge of the front folded half of the fabric base through the loop which is then positioned on the back folded half of the fabric base; and pulling the bottom edge of the front folded half of the fabric base through the loop and securing the towel to the horizontal member.

2. The method of claim 1, wherein the horizontal member is one from the group consisting of a horizontal rod, horizontal rack, horizontal bar or handle.

3. The method of claim 1, wherein the term horizontal is used to provide an orientation for purposes of defining the towel and refers to being parallel to the ground and wherein, in a similar manner, the term vertical refers to being perpendicular to the ground.

4. The method of claim 1, wherein the fabric base has a rectangular shape.

* * * * *